(12) United States Patent
Dettinger et al.

(10) Patent No.: US 7,774,355 B2
(45) Date of Patent: Aug. 10, 2010

(54) DYNAMIC AUTHORIZATION BASED ON FOCUS DATA

(75) Inventors: Richard D. Dettinger, Rochester, MN (US); Janice R. Glowacki, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 11/326,560

(22) Filed: Jan. 5, 2006

(65) Prior Publication Data

US 2007/0156668 A1 Jul. 5, 2007

(51) Int. Cl.
*G06F 7/00* (2006.01)

(52) U.S. Cl. .................................. 707/766; 707/783
(58) Field of Classification Search .................. None
See application file for complete search history.

(56) References Cited

U.S. PATENT DOCUMENTS

| | | | |
|---|---|---|---|
| 5,471,611 A | 11/1995 | McGregor | |
| 5,734,887 A | 3/1998 | Kingberg et al. | |
| 6,442,543 B1 | 8/2002 | Snodgrass et al. | |
| 6,553,368 B2 | 4/2003 | Martin et al. | |
| 6,581,060 B1 * | 6/2003 | Choy | 707/9 |
| 6,725,227 B1 | 4/2004 | Li | |
| 6,757,680 B1 * | 6/2004 | Choy | 707/9 |
| 6,928,431 B2 | 8/2005 | Dettinger et al. | |
| 6,954,748 B2 | 10/2005 | Dettinger et al. | |
| 6,996,558 B2 | 2/2006 | Dettinger et al. | |
| 7,054,877 B2 | 5/2006 | Dettinger et al. | |
| 7,096,229 B2 | 8/2006 | Dettinger et al. | |
| 7,240,046 B2 * | 7/2007 | Cotner et al. | 707/3 |
| 7,461,052 B2 | 12/2008 | Dettinger et al. | |
| 2002/0078068 A1 | 6/2002 | Krishnaprasad et al. | |
| 2002/0174129 A1 * | 11/2002 | Aldrich et al. | 707/101 |
| 2003/0172056 A1 | 9/2003 | Dettinger et al. | |
| 2004/0148278 A1 | 7/2004 | Milo et al. | |
| 2004/0267760 A1 | 12/2004 | Brundage et al. | |
| 2005/0038783 A1 * | 2/2005 | Lei et al. | 707/5 |
| 2005/0144176 A1 * | 6/2005 | Lei et al. | 707/100 |
| 2005/0165799 A1 * | 7/2005 | Wong | 707/100 |

OTHER PUBLICATIONS

Bo Luo, Dongwon Lee, Wang-Chien Lee, and Peng Liu, "QFilter: Fine-Grained Run-Time XML Access Control via NFA-based Query Rewriting", CIKM'04, Nov. 8-13, 2004, Washington, DC, USA p. 543-552.*

Restriction Action for U.S. Appl. No. 11/005,418, dated Mar. 12, 2007.

(Continued)

*Primary Examiner*—Neveen Abel Jalil
*Assistant Examiner*—Vei-Chung Liang
(74) *Attorney, Agent, or Firm*—Patterson & Sheridan, LLP (57) ABSTRACT

A mechanism is disclosed for selecting an authorization filter to apply when executing a database query, based on the focus of the database query. Based on the focus specified for a given of the query, different conditions may be added during query processing to a database query. Doing so provides a flexible approach to managing data access requests where queries may focus on the same underlying data from many different perspectives.

18 Claims, 6 Drawing Sheets

OTHER PUBLICATIONS

Non Final Action for U.S. Appl. No. 11/005,418, dated May 1, 2007.
Final Office Action for U.S. Appl. No. 11/005,418, dated Nov. 16, 2007.
Non Final Action for U.S. Appl. No. 10/083,075, dated Nov. 26, 2004.
Final Office Action for U.S. Appl. No. 10/083,075, dated May 5, 2005.
Restriction Action for U.S. Appl. No. 10/403,356, dated Sep. 20, 2005.

* cited by examiner

DYNAMIC AUTHORIZATION BASED ON FOCUS DATA

CROSS-REFERENCE TO RELATED APPLICATIONS

This application is related to the following: commonly assigned, co-pending, U.S. patent application Ser. No. 10/083,075, filed Feb. 26, 2002, titled "Application Portability and Extensibility through Database Schema and Query Abstraction;" commonly assigned, co-pending U.S. patent application Ser. No. 10/403,356, filed Mar. 31, 2003, titled "Dealing with Composite Data through Data Model Entities;" and commonly assigned, co-pending application titled "Abstract Query Plan," Ser. No. 11/005,418, filed Dec. 6, 2004, each of which is incorporated by reference herein in its entirety.

BACKGROUND OF THE INVENTION

1. Field of the Invention

The present invention generally relates to computer databases. More specifically, the present invention relates to data access authorizations used to filter query results based on the focus of a database query.

2. Description of the Related Art

Computer databases are well known systems used to store, maintain, and retrieve data. Generally, a database is a collection of data that is organized in a manner to allow its contents to be easily accessed, managed, and updated. The most prevalent type of database used today is the relational database, which organizes data using tables, and relationships between tables. For example, the DB2® family of RDBMS (relational database management system) products available from International Business Machines, Inc. (IBM) provides a sophisticated commercial implementation of a relational database.

Tables in a relational database include one or more columns. Each column typically specifies a name and a data type (e.g., integer, float, string, etc.), and is used to store a common element of data. For example, in a table storing data related to patients, each patient might be referenced using a patient identification number stored in a "patient ID" column. Data from each row of this table is related to the same patient, and generally referred to as a "record." Tables that share at least one element in common (e.g., the patient ID column) are said to be "related." Additionally, tables without a common data element may be related through other tables that do share such elements.

A relational database query may specify which columns to retrieve data from, how to join columns from multiple tables, and conditions that must be satisfied for a particular data record to be included in a query result set. Current relational databases typically process queries composed in a format specified by a query language. For example, the widely used query language SQL (short for Structured Query Language) is supported by virtually every database available today. An SQL query is composed using a syntax that requires the use of one or more clauses set off using specific keywords. Composing a proper SQL query requires that a user understand the structure and content of the relational database (i.e., a schema of tables and columns) as well as the complex syntax of the SQL query language. This complexity often makes it difficult for average users to compose relational database queries.

Accordingly, query applications have been developed to simplify the process of composing a database query. For example, database abstraction techniques are available that allow a user to compose an abstract or logical query using logical fields that reflect the substantive content of the data being queried independently from the particular manner of data representation used by the database storing the data (e.g., a relational schema). Using such applications, a user may compose a query and submit it to a database management system (DBMS). In response, the DBMS may generate an actual or physical query that may be executed by the underlying DBMS (e.g., an SQL query). Thus, database abstraction techniques free a user from having to understand the complexity of a query language and database schema. Typically, the query results include a table populated with rows that satisfy conditions specified by the query.

As ever increasing amounts of data is stored and managed in an electronic form that may be queried, what data a given user may access from a database is an area of great concern. One approach to managing access to a database is to associate one or more authorization routines with certain fields that may be included in a database query. Such authorization routines may add a clause to a relational query generated by a query application. When the DBMS executes the query, the added clause may limit or modify the data returned from the database. Typically, however, these authorization routines are static in that a single authorization routine is always associated with a given field. Thus, regardless of the purpose of the query, or the individual wishing to perform the query, the same authorization routine is used for any query that includes the routine.

While this works as intended, it has proven to be unduly restrictive in some cases. For example, even though the same field may be included in many different queries, the focus of queries may differ from one another. Thus, in some cases, the authorization routine for a given field may exclude data from query results that are not inappropriate, or perhaps worse, may include data in query results that are inappropriate based on the focus of the query. Thus, depending on the focus of a given database query, the restrictions imposed by a given authorization routine may, or may not, operate as intended to restrict access to a database data.

Accordingly, there remains a need for associating a database query authorization routines in a flexible and effective manner, based on query focus data.

SUMMARY OF THE INVENTION

Embodiments of the invention provide a mechanism for selecting an authorization routine to apply when executing a database query, based on the focus of the database query One embodiment of the invention includes a method for managing access to data in a database organized according to a particular schema. The method generally includes, receiving a database query that includes a reference to a focus entity specifying a focus for the query, wherein the focus entity is selected from a plurality of predefined focus entities, each focus entity being defined by a plurality of data relationships between data in the database. The method generally further includes, selecting an authorization filter to apply to the database query, based on the referenced focus entity, the authorization filter being selected from a plurality of authorization filters each corresponding to a different focus entity, applying the selected authorization filter to identify one or more conditions added to the database query, and modifying the database query to include the one or more conditions.

Another embodiment of the invention provides a computer-readable medium containing a program, which when executed on a computer system performs an operation for managing access to data in a database based on the focus of a database query. The operation generally includes, receiving a database query that includes a reference to a focus entity specifying a focus for the query, wherein the focus entity is selected from a plurality of predefined focus entities, each focus entity being defined by a plurality of data relationships between data in the database. The operation generally further includes, selecting an authorization filter to apply to the database query, based on the referenced focus entity, the authorization filter being selected from a plurality of authorization filters each corresponding to a different focus entity, applying the selected authorization filter to identify one or more conditions added to the database query, and modifying the database query to include the one or more conditions.

Another embodiment of the invention provides a computing device that includes a processor and a memory configured to store an application that includes instructions which, when executed by the processor, cause the processor to perform operations for managing access to data in a database based on the focus of a database query. The operations generally include, receiving a database query that includes a reference to a focus entity specifying a focus for the query, wherein the focus entity is selected from a plurality of predefined focus entities, each focus entity being defined by a plurality of data relationships between data in the database. The operations generally further include, selecting an authorization filter to apply to the database query, based on the referenced focus entity, the authorization filter being selected from a plurality of authorization filters each corresponding to a different focus entity, applying the selected authorization filter to identify one or more conditions added to the database query, and modifying the database query to include the one or more conditions.

BRIEF DESCRIPTION OF THE DRAWINGS

So that the manner in which the above recited features of the invention can be understood, a more particular description of the invention, briefly summarized above, may be had by reference to the exemplary embodiments that are illustrated in the appended drawings. Note, however, that the appended drawings illustrate only typical embodiments of this invention and should not, therefore, be considered limiting of its scope, for the invention may admit to other equally effective embodiments.

DETAILED DESCRIPTION OF THE PREFERRED EMBODIMENTS

Embodiments of the invention provide a mechanism for selecting an authorization routine to apply when processing a database query based on the focus of the database query. In general, the focus of the query refers to the perspective of a user regarding the data being queried. For example, a physician may wish to query a database to identify certain patients, while a researcher may wish to compose a query to identify interesting or unusual patterns of medical tests results, independent of any particular patient. Accordingly, the focus of a query composed by the physician could be termed "patients," and the focus of a query composed by the researcher could be termed "medical tests" or "research." At the same time, however, the data underlying queries from both the physician and the researcher may be the same. In one embodiment, different authorization routines may be applied to the queries of the physician and the researcher to manage the data accessed by these users.

For instance, if the physician composes a query to identify patients in Minnesota with high sugar levels, the focus of the query would be on the blood test results and patient location. Thus, the query focus would be on patients, as the query should return an indication of patients represented in the database that satisfy the conditions. For this query, an authorization routine may add a condition to ensure that only patients who have provided consent to the disclosure of personally identifying data are included in the result set. However, if the researcher composes a query to identify patients with high sugar levels that also have low blood pressure, and the query does not request access to any personally identifying patient information, the focus of the query would be on the "medical tests" or "research." For this query, the authorization routine may contain a different condition such as one that limits test results to ones meeting some standard of quality control, ensuring that only validated data is provided in response to the query.

In one embodiment, a data abstraction model is used to provide a query application for users to compose a database query. As described in greater detail below, the data abstraction model provides a query building interface focused on the substantive content of a particular database, independently from the particular manner of data representation used by the database (e.g., a relational schema). Additionally, the data abstraction model may provide one or more query objects referred to herein as a "model entity." Users may identify the focus for a query by selecting a model entity. Based on the model entity specified for a query, different authorization routines may be invoked to manage what data is accessed in response to the query.

A data abstraction model may be used to expose data to users in an intuitive manner, and users may compose and submit queries without a detailed understanding of the underlying storage mechanism. At the same time data access management may be provided by the authorization routines provided for different model entity objects provided by the data abstraction model. Although embodiments of the invention are described herein relative to one possible embodiment of the data abstraction model, the invention is not limited to such, and the invention may be adapted to database query applications that do not rely on a data abstraction model.

Furthermore, the following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in a variety of ways.

Figure 2A:
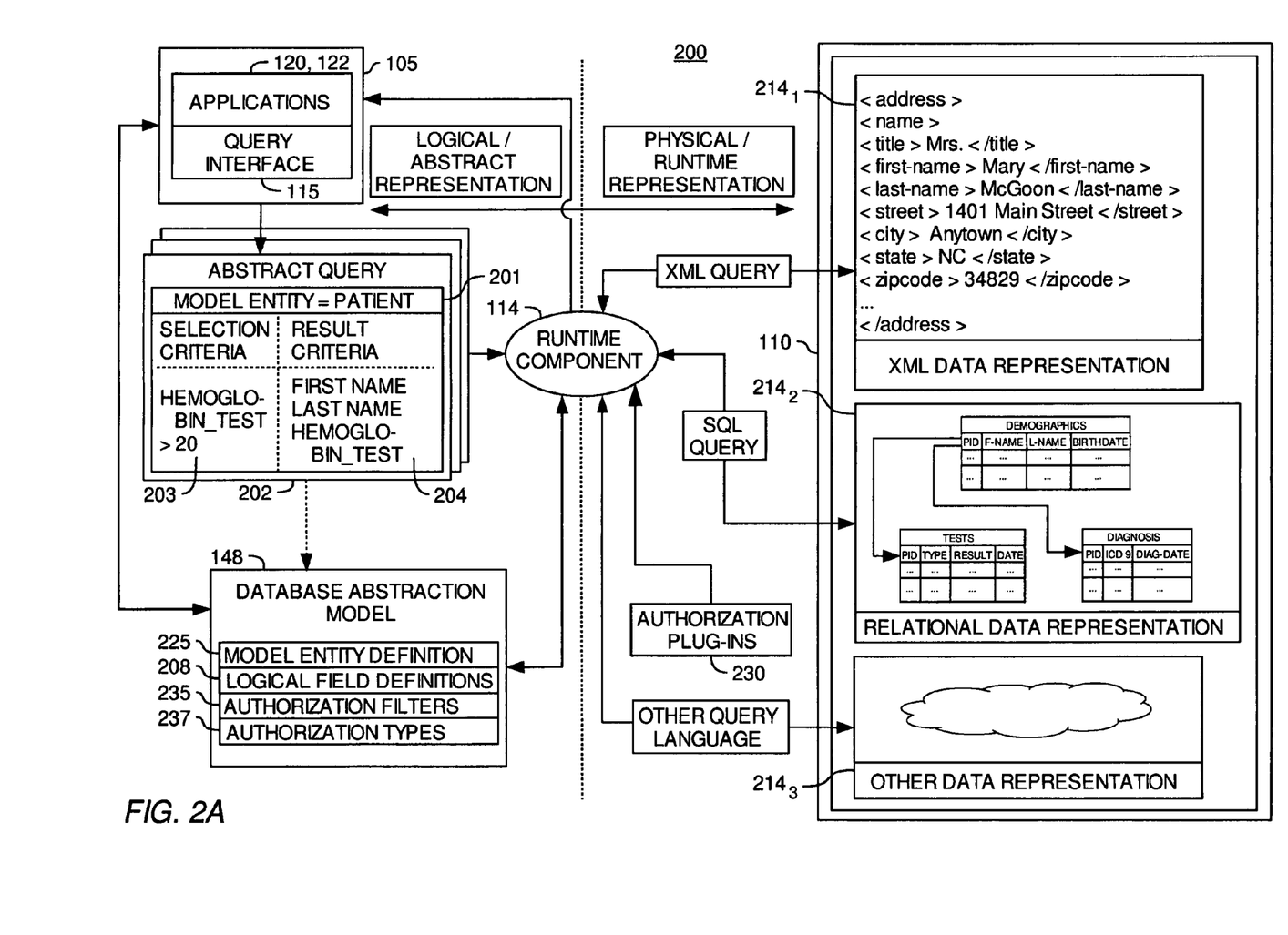
FIG. 2A illustrates a logical view of the database abstraction model constructed over an underlying physical database, according to one embodiment of the invention.
Figure 2B:
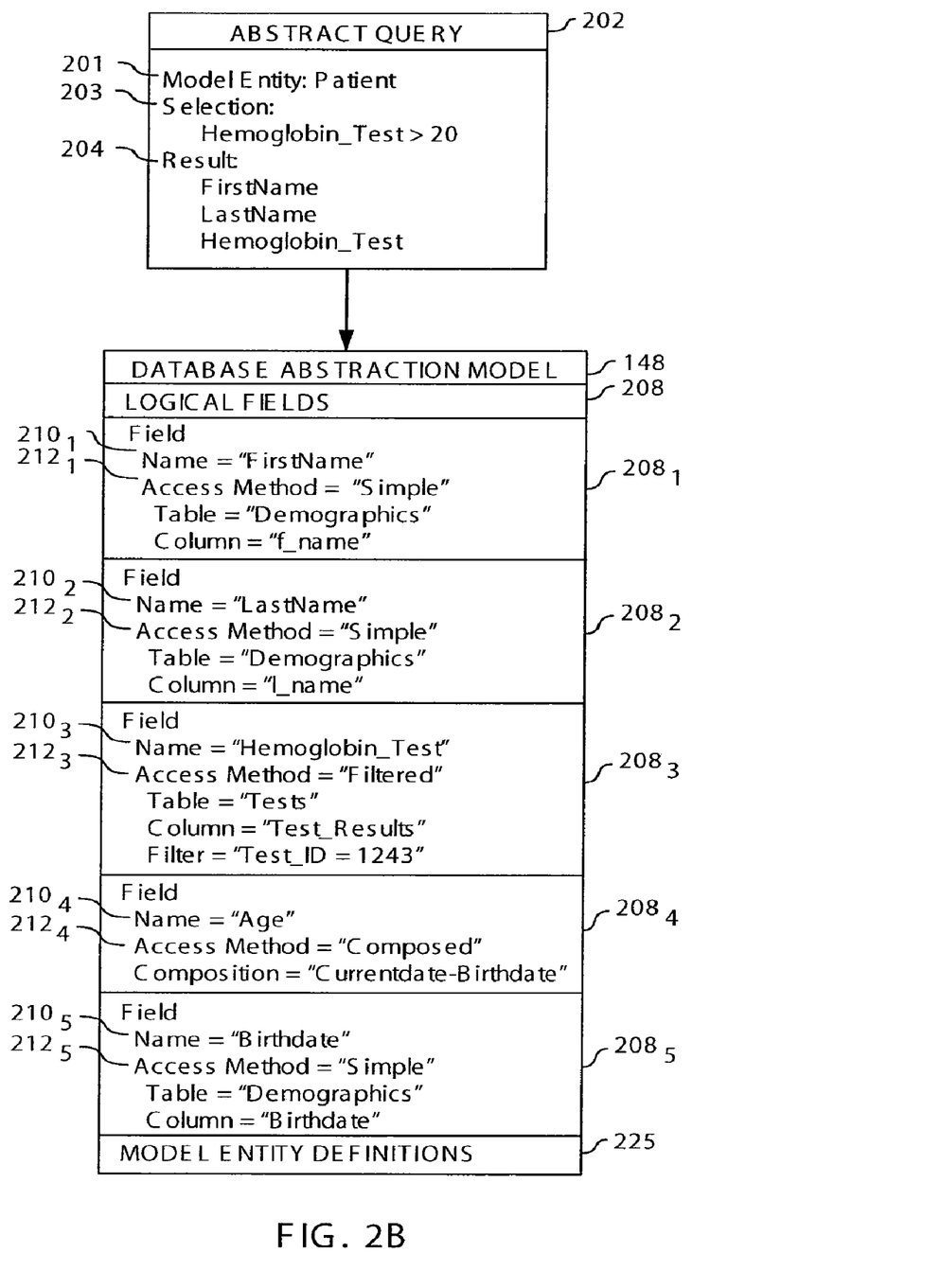
FIGS. 2B-2C illustrate an exemplary abstract query and database abstraction model, according to one embodiment of the invention.
Figure 2C:
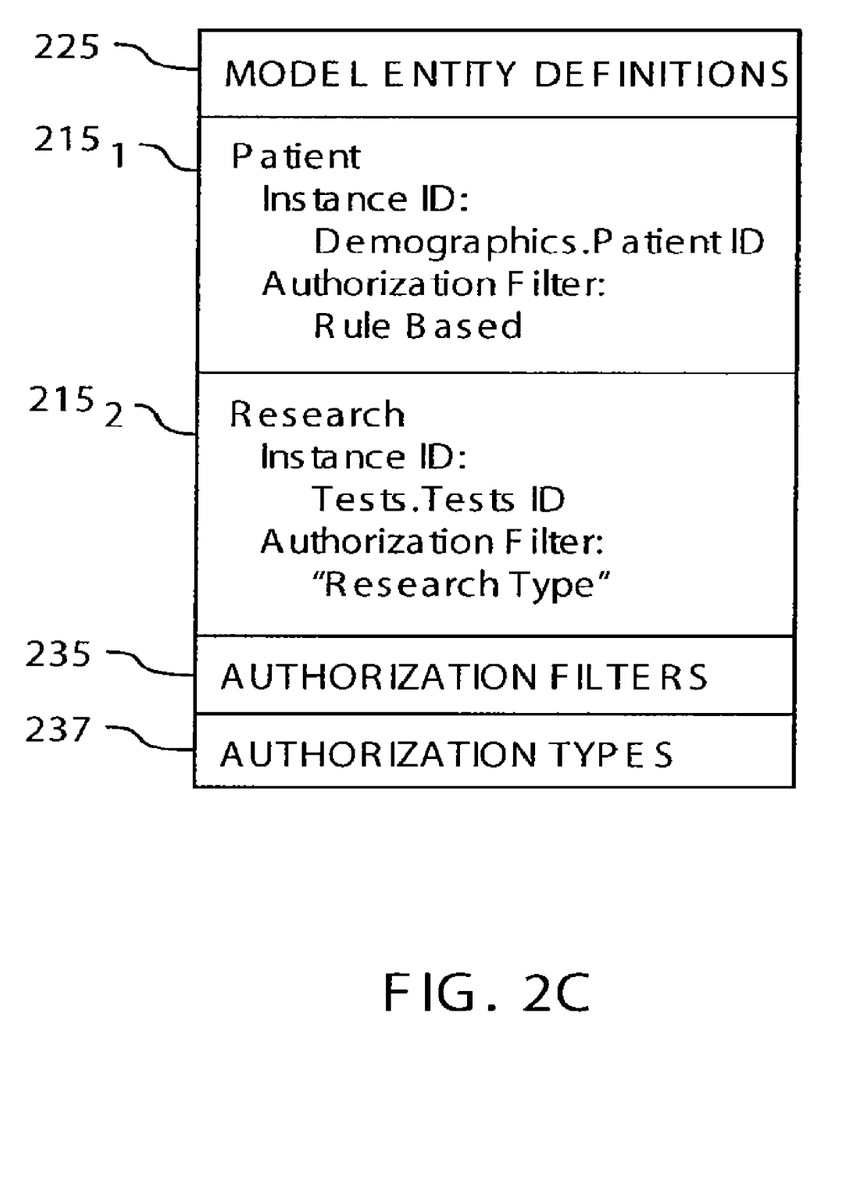
Figure 3:
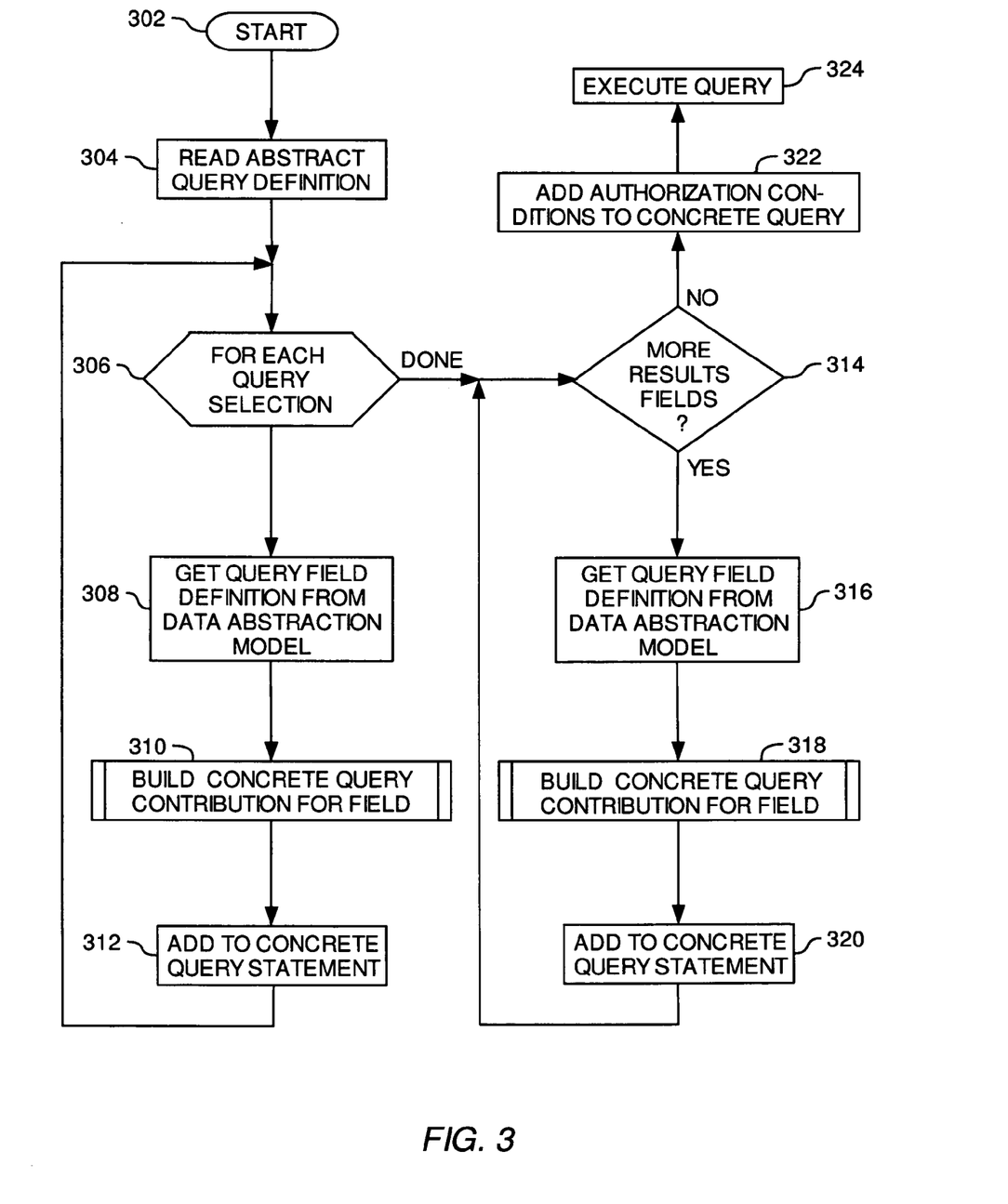
FIG. 3, illustrates a runtime method for generating an executable query from an abstract query, according to one embodiment of the invention.
Figure 4:
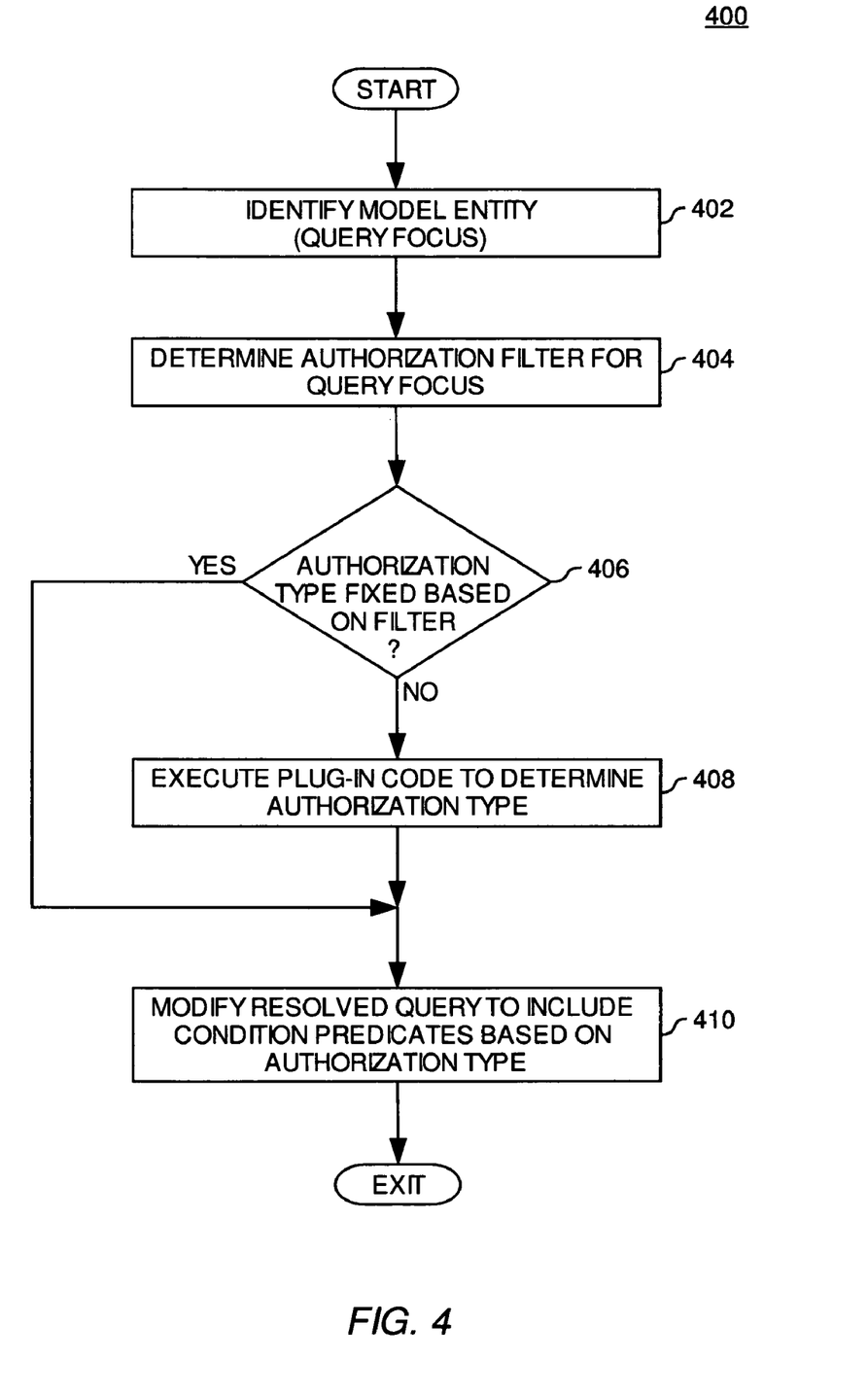
FIG. 4 illustrates a method for adding one or more access conditions to a concrete query generated from an abstract query using the method illustrated in FIG. 3, according to one embodiment of the invention.

Moreover, examples described herein reference medical research environments. These examples are provided to illustrate embodiments of the invention, as applied to one type of data environment. The techniques of the present invention, however, are contemplated for any data environment including, for example, transactional environments, financial environments, research environments, accounting environments, legal environments, and the like. FIGS. 1-2 illustrate an embodiment of the database abstraction model constructed for an underlying physical data representation. FIGS. 3-4 illustrate exemplary methods for processing abstract queries generated according to the database abstraction model The Database Abstraction Model: Physical View of the Environment FIG. 1 illustrates a networked computer system using a client-server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on client system 105 (e.g., a LINUX® distribution, a version of the MICROSOFT WINDOWS® operating system IBM's AIX® or OS/400®, the FREEBSD® operating system, and the like). ("Linux" is a registered trademark of Linus Torvalds in the United States and other countries.)

The server system 110 may include hardware components similar to those used by client system 105. Accordingly, the server system 110 generally includes a CPU, a memory, and a storage device, coupled by a bus (not shown). The server system 110 is also running an operating system, (e.g., a LINUX® distribution, MICROSOFT WINDOWS®, IBM's OS/400® or AIX®, the FREEBSD® operating system, and the like).

Figure 1:
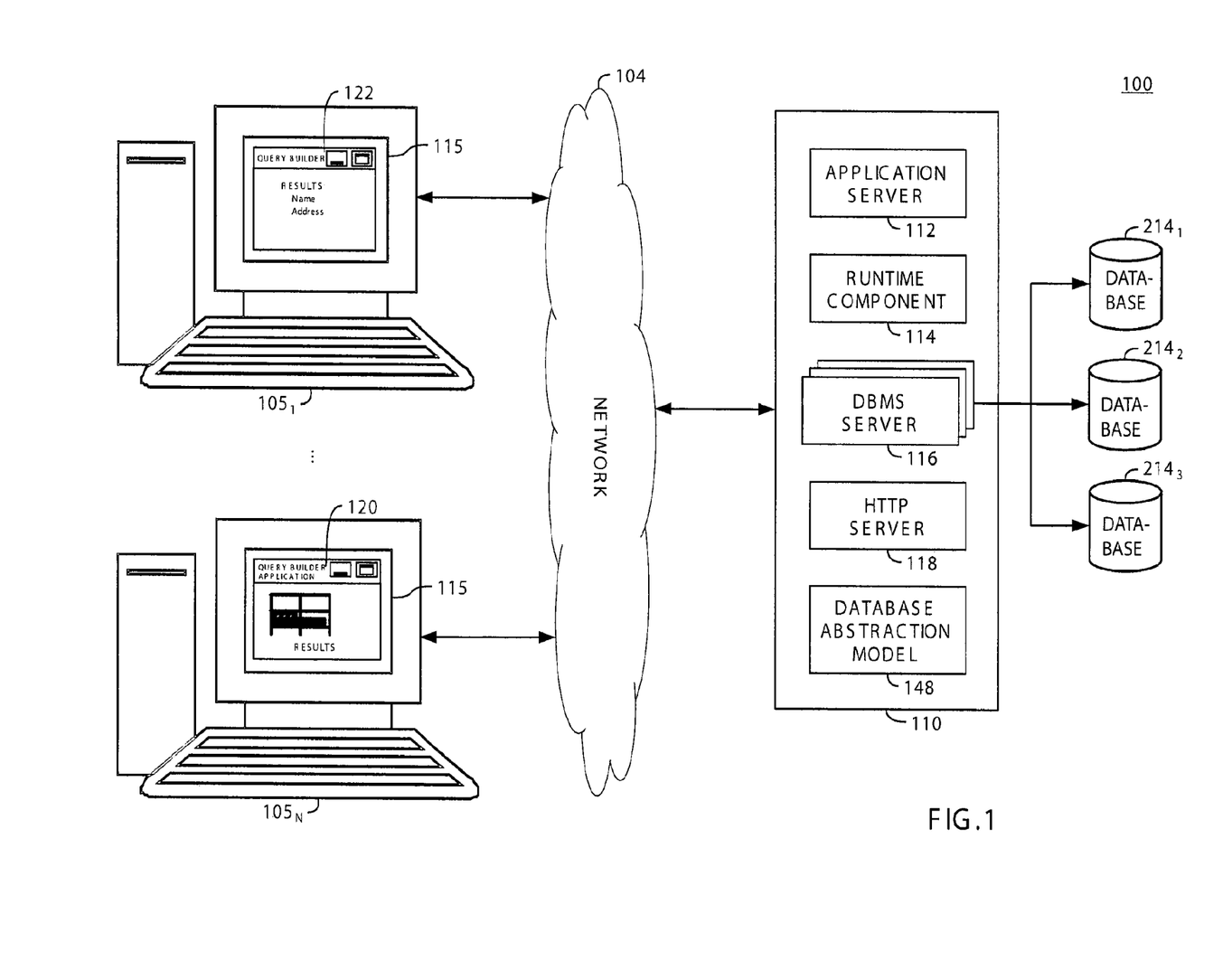
FIG. 1 illustrates an exemplary computing and data communications environment, according to one embodiment of the invention.

The environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and application 120 may be configured to allow a user to compose an abstract query, and to submit the query to the runtime component 114 for processing.

As illustrated in FIG. 1, server system 110 may further include runtime component 114, DBMS server 116, and database abstraction model 148. In one embodiment, these components may be provided using software applications executing on the server system 110. The DBMS server 116 includes a software application configured to manage databases $214_{1-3}$. That is, the DBMS server 116 communicates with the underlying physical database system, and manages the physical database environment behind the database abstraction model 148. Users interact with the query interface 115 to compose and submit an abstract query to the runtime component 114 for processing. Typically, users compose an abstract query from the logical fields defined by the database abstraction model 148. Logical fields and access methods are described in greater detail below in reference to FIGS. 2A-2B.

In one embodiment, the runtime component 114 may be configured to receive an abstract query, and in response, to generate a "resolved" or "concrete" query of underlying physical databases 214. For example, the runtime component 114 may be configured to generate one or more SQL queries from an abstract query. The resolved queries generated by the runtime component 114 are supplied to DBMS server 116 for execution. Additionally, the runtime component 114 may be configured to modify the resolved query with additional restrictions or conditions, based on the focus of the abstract query.

The Database Abstraction Model: Logical View of the Environment

FIG. 2A illustrates a plurality of interrelated components 200 of a database abstraction model, along with relationships between the logical view of data provided by the abstraction model environment (the left side of FIG. 2A), and the underlying physical database mechanisms used to store the data (the right side of FIG. 2A).

In one embodiment, the database abstraction model 148 provides definitions for a set of logical fields 208 and a set of model entity definitions 225. Users compose an abstract query 202 by specifying selection criteria 203 and result fields 204. An abstract query 202 may identify a selected model entity 201 from the set of model entity definitions 225. The resulting query is generally referred to herein as an "abstract query" because it is composed using logical fields 208 rather than direct references to data structures in the underlying physical databases 214. The model entity definitions 225 may be used to indicate the focus of the abstract query 202 (e.g., a "patient", a "person", an "employee", a "test", a "facility" etc). Additional examples of model entity definitions 225 are described in commonly assigned, co-pending application Ser. No. 10/403,356, filed Mar. 31, 2003, titled "Dealing with Composite Data through Data Model Entities," incorporated herein by reference in its entirety.

Illustratively, abstract query 202 indicates that abstract query 202 is focused on instances of the "patient" model entity 201. Abstract query 202 further includes selection criteria 203 indicating that data for patients with a "hemoglobin_test >20" should be retrieved in response to processing the abstract query 202. The selection criteria 203 are composed by specifying a condition evaluated against the data values corresponding to a logical field 208 (in this example, the "hemoglobin_test" logical field). The operators in a condition typically include comparison operators such as =, >, <, >=, or, <=, and logical operators such as AND, OR, and NOT. Result fields 204 indicate that data retrieved for abstract query 202 should return data for the "name," and "hemoglobin_test" logical fields for each instance of the "patients" entity that have data satisfying selection criteria 203 in the underlying physical database.

In one embodiment, users compose an abstract query 202 using query building interface 115. The interface 115 may be configured to allow users to compose an abstract query 202 from the logical fields 208. The definition for each logical field 208 in the database abstraction model 148 may identify an access method. The access method may be used to map from the logical view of data exposed to a user interacting with the interface 115 to the physical view of data used by the runtime component 114 to retrieve data from the physical databases 214. Thus, the runtime component 114 retrieves data from the physical database 214 by generating a resolved query from the abstract query 202, according to the access methods 208 for the logical fields included in the query. For example, an access method may include a query contribution used in building a resolved query, such as one or more SQL clauses that reference data objects in the underlying physical database 214.

Further, depending on the access method specified for a logical field 208, the runtime component 114 may generate a query of many different underlying storage mechanisms. For example, for a given logical field, the runtime component may be generate an XML query that queries data from database $214_1$, an SQL query of relational database $214_2$, or other query composed according to another physical storage mechanism using "other" data representation $214_3$, or combinations thereof (whether currently known or later developed).

In addition to logical field definitions 208, the database abstraction model 148 may includes definitions for model entities 225 authorization filters 235 and authorization types 237. As described, each model entity 225 may be used to identify the focus of a given abstract query. Authorization filters 235 may be used to determine how a query should be modified, based on the particular model entity 225 specified for the query (i.e., based on query focus). Authorization types 237 provide the specific query conditions to add to a database query submitted by a user. For example, an authorization type may provide an SQL clause added to a resolved query. Authorization filters 235 and authorization types 237 are described in greater detail below in reference to FIG. 2B. In one embodiment, authorization plug-in 230 may be used manage the authorization filters 235. For example, the definition for a particular model entity 225 may specify an authorization plug-in 230 to invoke each time a query is submitted that specifies the particular model entity as the focus for the query. The plug-in itself may be an executable code component configured to dynamically identify an authorization filter 237 used for a particular query, based on criteria such as user or role based criteria. Thus, the authorization plug-in 230 may be used to provide an additional degree of flexibility in the application of authorization routines to database queries. However, authorization filters 235 that operate without reference to a plug-in 230 are also contemplated. For example, instead of referencing a plug-in 230, an authorization filter 235 may provide a direct reference to an authorization type 237.

FIG. 2B illustrates an exemplary abstract query 202, relative to the database abstraction model 148, according to one embodiment of the invention. The query includes selection criteria 203 indicating that the query should retrieve instances of the patient model entity 201 with a "hemoglobin" test value greater than "20." The particular information retrieved using abstract query 202 is specified by result fields 204. In this example, the abstract query 202 retrieves a patient's name and a test result value for a hemoglobin test. The actual data retrieved may include data from multiple tests. That is, the query results may exhibit a one-to-many relationship between a particular model entity and the query results.

An illustrative abstract query corresponding to abstract query 202 is shown in Table I below. In this example, the abstract query 202 is represented using eXtensible Markup Language (XML). In one embodiment, application 120 may be configured to generate an XML document to represent an abstract query composed by a user interacting with the query building interface 115. Those skilled in the art will recognize that XML is a well known markup language used to facilitate the sharing of structured text and information, other markup languages, however, may be used.

TABLE I

Abstract Query Example—XML

```
001  <?xml version="1.0"?>
002  <!--Query string representation: ("Hemoglobin_test > 20") -->
003  <QueryAbstraction>
004      <Selection>
005          <Condition>
006              <field="Hemoglobin Test" operator="GT" value="20"/>
007          </Condition>
008      </Selection>
009      <Results>
010          <Field name="FirstName"/>
011          <Field name="LastName"/>
012          <Field name="hemoglobin_test"/>
013      </Results>
014      <Entity name="patient" >
015          <FieldRef name="data://demographics/PatientID" />
016          <Usage type="query" />
017          </EntityField>
018      </Entity>
```

The XML markup shown in Table I includes the selection criteria 203 (lines 004-008) and the results criteria 204 (lines 009-013). Selection criteria 203 includes a field name (for a logical field), a comparison operator (=, >, <, etc) and a value expression (what the field is being compared to). In one embodiment, the result fields 204 include a set of logical fields for which data should be returned. The actual data returned is consistent with the selection criteria 203. Line 14 identifies the model entity selected by a user, in this example, a "patient" model entity. Thus, the query results returned for abstract query 202 are instances of the "patient" model entity. Line 15 indicates the identifier in the physical database 214 used to identify instances of the model entity. In this case, instances of the "patient" model entity are identified using values from the "Patient ID" column of a demographics table.

Once composed, a user may submit an abstract query to runtime component 114 for processing. In one embodiment, the runtime component 114 may be configured to process the abstract query 202 by generating an intermediate representation of the abstract query 202, such as an abstract query plan. An abstract query plan is composed from a combination of abstract elements from the data abstraction model and physical elements relating to the underlying physical database. For example, an abstract query plan may identify which relational tables and columns are referenced by the access methods of the logical fields included in the abstract query. The runtime component may then parse the intermediate representation in order to generate a physical query of the underlying physical database (e.g., an SQL statement(s)). Abstract query plans and query processing are further described in a commonly assigned, co-pending application entitled "Abstract Query Plan," Ser. No. 11/005,418, filed Dec. 6, 2004, which is incorporated by reference herein in its entirety. Additionally, FIG. 3 illustrates an exemplary method for processing an abstract query to generate an executable query of an underlying physical database.

FIG. 2B further illustrates an embodiment of a database abstraction model 148 that includes a plurality of logical field specifications $208_{1-5}$ (five shown by way of example). The access methods included in a given logical field specification 208 (or logical field, for short) provide mapping for the logical field 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by the database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$, and $208_5$ each provide a simple access method, $212_1$, $212_2$, and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "Test_Result" column of a "Tests" tests table and defines a filter "Test_ID='1243.'" Only data that satisfies the filter is returned for this logical field. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. Another example includes a "name" logical field (not shown) composed from the first name and last name logical fields $208_1$, and $208_2$.

By way of example, the field specifications 208 shown in FIG. 2B are representative of logical fields mapped to data represented in the relational data representation $214_2$. However, other instances of the data repository abstraction component 148 or, other logical field specifications, may map to other physical data representations (e.g., databases $214_1$ or $214_3$ illustrated in FIG. 2A). Further, in one embodiment, the database abstraction model 148 is stored on computer system 110 using an XML document that describes the model entities, logical fields, access methods, and additional metadata that, collectively, define the database abstraction model 148 for a particular physical database system. Other storage mechanisms or markup languages, however, are also contemplated.

FIG. 2C illustrates model entity definitions 225. As shown, the definitions 225 include a definition for a "patient" model entity and a "research" model entity. Instance identifier 215 may be used by the runtime component 114 to map from the logical perspective of the data abstraction model to data values representing the model entity in the underlying database 214. As shown, instance identifier $215_1$, indicates a value used by database 214 to represent different instances of the "patient" model entity (i.e., to represent different patients). Similarly, instance identifier $215_2$ indicates a value used by database 214 to represent different instances of the "research" model entity (i.e., to represent different tests). An illustrative definition for the "patient" model entity and the "research" model entity is shown in Table II below. In this example, model entity definitions 225 are represented using XML, although other markup languages may be used.

TABLE II

Model Entity Definitions—XML

```
001    <Entity name="Patient" authorizationFilter="RoleBased" >
002        <EntityField required="Hard">
003            <FieldRef name="data://Demographic/Patient_ID" />
004            <Usage type="query focus" />
005        </EntityField>
006    </Entity>
007    <Entity name="Research" authorizationFilter="ResearchType" >
008        <EntityField required="Hard">
009            <FieldRef name="data://Tests/Test_ID" />
010            <Usage type="query focus" />
011        </EntityField>
012    </Entity>
```

Lines 001 and 007 provide the names for the "patient" and "research" model entities, respectively. Lines 003 and 009 map the "patient" and "research" model entities to the physical location in an underlying database. That is, these lines define instance identifiers $215_1$ and $215_2$. Specifically, instances of the "patient" model entity may be identified by values recorded in the "Patient ID" column of a "Demographic" table. Similarly, instances of the "Research" model entity may be identified by values recorded in the "Test ID" column of a "Tests" table.

Lines 004 and 010 indicate that the "research" and "patient" model entities are available to indicate the query focus for a given abstract query. Thus, the model entity may act as a focus entity for an abstract query. In one embodiment, the data abstraction model 148 may associate an authorization filter with each model entity. For example, lines 001 and 007 of Table II associate the authorization filters 235 of "RoleBased" and "ResearchType" with the "research" and "patient" model entities, respectively. However, those skilled in the art will recognize that other embodiments may use different data objects as a focus entity used to specify the focus of a given query.

When processing a query with a focus indicated by a model entity, the authorization filter may be used to identify the actual access conditions added to a concrete query generated from an abstract query. Accordingly, the model entity and authorization filter provide a hierarchy from which conditions may be determined to add to a given query based on query focus. At the top of the hierarchy is the focus of the query identified by the model entity. Once identified, the authorization filter associated with the model entity may be used to determine the actual conditions added to a concrete query.

As described, each model entity definition 225 may be associated with an authorization filter (e.g., the authorization filters shown on lines 001 and 007 in Table II). An illustrative definition for the authorization filters 235 for "patient" and "research" model entities is shown in Table III below. In this example, authorization filters 235 are represented using XML, although other markup languages may be used.

TABLE III

Authorization Filters—XML

```
001    <Authorization>
002    <AuthorizationFilter name="RoleBased">
003    <Type = "class"className="GenerateUserRoleBase">
004        <List>
005            <Value actualVal="DivisionX"
                   authorization="Research" />
006            <Value actualVal="DivisionY"
                   authorization="Treatment" />
007            <Value actualVal="DivisionA"
                   authorization="Accounting" />
008            <Value actualVal="DivisionB"
                   authorization="Educational" />
009        </List>
010    </Type>
011    </AuthorizationFilter>
012    <AuthorizationFilter name="ResearchType">
013    <Type = "class" className=" GenerateResearchType">
014        <List>
015            <Value actualVal="DivisionX"
                   authorization="Research" />
016            <Value actualVal="DivisionY"
                   authorization="Educational" />
017        </List>
018    </Type>
019    </AuthorizationFilter>
```

Lines 001-011 correspond to the authorization filter specified for the "patient" model entity, and lines 12-19 correspond to the authorization filter specified for the "research" model entity. By separating the definition of the authorization filter 235 from the definition 225 for the model entity, multiple model entities may share the same authorization filter. Also, this allows the model entity definitions 225 and authorization filter definitions 235 to be modified independently from one another. Lines 003 and 013 specify an authorization plug-in 230 to invoke when processing a query focused on the "patient" and "research" model entities, respectively.

In one embodiment, the authorization plug-in 230 may be an executable class, module program or routine configured to return a value used to select an authorization type. For example, lines 004-009 illustrate four different return values for a "GenerateUserRoleBase" plug-in 230 referenced by the authorization filter 235 for the definition 225 for the "patient" model entity. Assume for this example that the four return values identify the "division" which the user submitting the query is associated with. Based on this, one of four different authorization types may be determined to use in processing a query. In this example, a "research," "treatment," "accounting," and "educational" authorization types may be used to select access conditions added while processing a database query. Assume for this example that the data abstraction model is being used by a large teaching hospital. Thus, the four authorization types could be used to apply different access restrictions on queries focused on the "patient" model entity submitted by researchers (the research authorization type), doctors (the treatment authorization type), claims and insurance processing employees (the accounting type) and medical students (the learning center authorization type). Thus, even though the same set of underlying data is being queried, and further, even though the same model entity (e.g., "patients") is being queried, the actual authorization routine used for a given query may vary from query to query. Similarly, the authorization plug-in 230 and a value list shown on lines 012-019 for the research model entity shows authorization types that may be applied to a query focused on the "research" model entity.

In one embodiment, the authorization type 237 specifies the actual query conditions that may be added to a query during query processing. An illustrative definition for the four authorization types identified for the "patient" model entity is shown in Table IV below. In this example, authorization types 235 are represented using XML, although other markup languages may be used.

TABLE IV

Authorization Types—XML

| | |
|---|---|
| 001 | <AuthType name="research"> |
| 002 |   <Selection> |
| 003 |     <Condition "where research.consent = true" /> |
| 004 |   </Selection> |
| 005 | </AuthType> |
| 006 | <AuthType name="treatment"> |
| 007 |   <Selection> |
| 008 |     <Condition "where Tests.quality = Valid" /> |
| 009 |   </Selection> |
| 010 | </AuthType> |
| 011 | <AuthType name="Accounting"> |
| 012 |   <Selection> |
| 013 |     <Condition "where Billing.Record = true" /> |
| 014 |   </Selection> |
| 015 | </AuthType> |
| 016 | <AuthType name="educational"> |
| 017 |   <Selection> |
| 018 |     <Condition "where Encounter.Site = Teaching Hospital" /> |
| 019 |   </Selection> |
| 020 | </AuthType> |

Lines 001-005, 006-010, 011-015, and 016-020, specify the query conditions added for the "research," "treatment," "accounting," and "educational" authorization types. Specifically, the conditions specified by the SQL "where" clauses in lines 003, 008, 013, and 108 provide a condition that may be added to a query focused on the "patient" model entity, depending on the authorization type identified by the "role based" authorization plug-in 230 (shown in lines 001 of Table II).

Referring now to FIG. 3, an illustrative runtime method 300 exemplifying one embodiment of generating an executable query from an abstract query (e.g., abstract query 240) using the runtime component 114 is shown. The method 300 is entered at step 302 when the runtime component 114 receives the abstract query as input. At step 304, the runtime component 114 reads and parses the abstract query to identify the individual selection criteria (e.g., selection criteria 203) and desired result fields (e.g., result fields 204).

At step 306, the runtime component 114 enters a loop (defined by steps 306, 308, 310 and 312) for processing each query selection criteria statement present in the abstract query, thereby building a data selection portion of a concrete query. At step 308, the runtime component 114 uses the field name from a selection criteria of the abstract query to look up the definition of the field in the data abstraction model 148. As noted above, the field definition 208 includes a definition of the access method used to access the data structure associated with the field. At step 310, the runtime component 114 then builds a concrete query contribution for the logical field 208 being processed. As used herein, a concrete query contribution is a portion of a concrete query that is used to perform data selection based on the current logical field 208. Further, as described above, a concrete query is a query represented in languages like SQL and XML Query and is consistent with the data of a given physical data repository (e.g., a relational database $214_2$ or XML repository $214_1$). Accordingly, the concrete query is used to locate and retrieve data from the physical data repository, represented by the database 214 shown in FIG. 2. At step 312, the concrete query contribution generated for the current field is then added to a concrete query statement. The method 300 then returns to step 306 to begin processing the next field of the abstract query. Accordingly, the process entered at step 306 is iterated for each data selection field in the abstract query, thereby contributing additional content to the concrete query.

After building the data selection portion of the concrete query, the runtime component 114 identifies the information to be returned as a result of query execution. As described above, in one embodiment, the abstract query defines a list of result fields, i.e., a list of logical fields that are to be returned as a result of query execution, referred to herein as a result specification. As described, the result field specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 234 looks up a result field name (from the result specification of the abstract query) in the data abstraction model 148 and then retrieves a result field definition from the data abstraction model 148 to identify the physical location of data to be returned for the current logical result field. At step, 318, the runtime component 114 then builds (at step 318) a concrete query contribution (of the concrete query that identifies physical location of data to be returned) for the logical result field. At step 320, the concrete query contribution is then added to the concrete query statement. Once each of the result specifications in the abstract query has been processed, processing continues at step 322.

At this step, the runtime component 114 determines the focus of the abstract query being processed and adds the appropriate query conditions to the concrete query. An exemplary method of modifying a concrete query on the basis query focus is described in more detail below with reference to FIG. 4. Processing then continues at step 324, where the concrete query is executed. Once executed, a set of query results, are returned to the requesting entity, as constrained by the authorization conditions added at step 322.

FIG. 4 illustrates a method for adding one or more authorization conditions to a concrete query, according to one embodiment of the invention. The method 400 begins at step 402 where the runtime component 114 identifies the focus of the query being processed. For example, the runtime component 114 may identify the model entity selected as the focus of an abstract query submitted for processing. At step 404, the runtime component 114 determines the authorization filter based on the focus of the query identified at step 402. For example, Table II, above illustrates two exemplary model entity definitions that specify authorization filters to use for queries focused on the "patients" and "research" model entities.

At step 406, a determination is made whether the authorization type may be fixed based on the authorization filter. If so, then at step 410 the query is modified based on the conditions specified for the identified authorization type 237. Otherwise, if the authorization filter 235 specifies to invoke a plug-in 230 to determine the correct authorization type 237, then the plug in is executed at step 408. Once the correct authorization type 237 is identified, the method 400 proceeds to step 410 and the concrete query is modified to include any conditions specified for the identified authorization type. For example, Table IV, above illustrates a set of exemplary authorization types and corresponding query conditions that may be added to a concrete query. After the query is modified to include additional conditions based on query focus, the query may be submitted to the DBMS 214 to retrieve a set of query results.

In addition to adding query conditions based on the query focus (i.e., based on the model entity), authorization conditions may be defined for logical fields included in the abstract query. Such conditions may be related logical fields in the query, or to other model entities. For example, consider a patient who has given their authorization to have medical records data used for research and has had several hemoglobin tests conducted. However, on inspection the tests were found to contain errors in method or sample quality and are therefore inconclusive. In order to avoid using bad data, the rows are marked in the Tests table as "invalid."

When the query focus is on the "patients", the authorization type may add condition "where research_consent=true", to a resolved query (as shown in line 008 of Table IV, above). Simultaneously, however, the definition for the hemoglobin logical field may specify that test results must be "valid" to be included in query results, regardless of query focus. When columns from the demographics table are joined with columns from the test table, the following rows are produced:

TABLE V

Sample Query Results

| Patient ID | Name | Research_Consent | Hemoglobin | Validity |
|---|---|---|---|---|
| 1001 | Ryan | True | 12 | Invalid |
| 1001 | Ryan | True | 14 | Invalid |
| 1001 | Ryan | True | 12.5 | Invalid |

As shown in Table V, the first three columns include data pulled from the demographics table and the last two columns show data from the tests table. If both authorization conditions are used, all rows would be eliminated from a set of query results because no row has both a research authorization of "yes" and a test quality of "valid." However, this may not be the desired result as the query is focused on "patients." In such a situation, a query condition not specified for the "patient" model entity should not completely eliminate an instance of a "patient" from the query results. In this example, the invalid test values should be eliminated, and not the instance of the "patients" model entity reflected by the patient ID of "1001". In such case, query results may be presented as shown in the following table:

TABLE VI

Filtered Query Results

| Patient ID | Name | Research Permission | Hemoglobin | Validity |
|---|---|---|---|---|
| 1001 | Ryan | Yes | NULL | NULL |

In one embodiment, the result shown in Table VI may be generated by examining which authorization rules apply to a model entity, and which may be included as part of a logical field. When an authorization type is not based on the focus of the query, then the concrete query may be modified to filter data from the query results, without removing instances of the model entity. For example, as shown in Table VI, the patient with a patient ID of "1001" is included, but the invalid results are masked. Thus, the conditions added to a database query based on an authorization type may cause the masking or filtering of data values from the query results, without removing instances of the entity represented by the focus of a given query.

As described, embodiments of the invention provide a query application that may be configured to manage requests for access to database records based on the focus identified for a given query. In one embodiment users specify the focus for a query by selecting a model entity defined by a data abstraction model. In one embodiment, the definition for a model entity may specify an authorization filter used to identify conditions added to queries focused on that model entity. Doing so provides a flexible approach to managing data access requests where queries may focus on the same underlying data from many different perspectives.

Thus, embodiments of the invention provide a flexible approach to data access management and allow the same data to be queried using different authorization filters, based on the focus of a given query.

While the foregoing is directed to embodiments of the present invention, other and further embodiments of the invention may be devised without departing from the basic scope thereof, and the scope thereof is determined by the claims that follow.

What is claimed is:

1. A method for managing access to data in a database organized according to a particular schema, comprising:
    receiving a database query that includes a reference to a focus entity specifying a user-selected focus for the database query independent from any database objects referenced in the database query, wherein the focus entity is selected from a plurality of predefined focus entities, wherein each focus entity is defined by a plurality of data relationships between data in the database and references at least one authorization filter, wherein each authorization filter directly specifies one or more database query conditions to add to the to the database query, and wherein the one or more database query conditions are composed according to a query language used by the database;
    selecting to apply at least the authorization filter referenced by the focus entity included in the database query to the database query, the selected authorization filter being selected from a plurality of authorization filters each corresponding to a different focus entity;
    retrieving the selected authorization filter to identify the one or more database query conditions to be added to the database query; and
    modifying the database query to include the one or more database query conditions; and
    executing the modified database query to retrieve a set of query results, as constrained by the one or more conditions added to the database query.

2. The method of claim 1, wherein applying the authorization filter comprises, invoking an executable plug-in associated with the authorization filter to identify an authorization type, wherein the identified authorization type specifies the particular one or more conditions to add to the database query.

3. The method of claim 2, wherein the executable plug-in determines an authorization type based on at least one of an identity of a user submitting the database query, a group membership of the user, and a functional role of the user.

4. The method of claim 1, wherein the added conditions comprise database query elements, composed according to a query language used by the database.

5. The method of claim 1, wherein the database query comprises an abstract query composed according to a data abstraction model, wherein the data abstraction model defines a plurality of logical fields, and wherein each logical field specifies an access method for accessing data in the database corresponding to the logical field, and wherein the data abstraction model defines the plurality of focus entities, wherein a user specifies the focus for the abstract query by selecting the focus entity from the plurality of focus entities.

6. The method of claim 5, wherein the modification to the database query includes masking data included in a set of query results, without removing instances of the selected focus entity from the set of query results.

7. A computer readable storage medium containing a program which, when executed on a processor, performs an operation for managing access to data in a database organized according to a particular schema, the operation comprising:
receiving a database query that includes a reference to a focus entity specifying a user-selected focus for the database query independent from any database objects referenced in the database query, wherein the focus entity is selected from a plurality of predefined focus entities, wherein each focus entity is defined by a plurality of data relationships between data in the database and references at least one authorization filter, wherein each authorization filter directly specifies one or more database query conditions to add to the to the database query, and wherein the one or more database query conditions are composed according to a query language used by the database;
selecting to apply at least the authorization filter referenced by the focus entity included in the database query to the database query, the selected authorization filter being selected from a plurality of authorization filters each corresponding to a different focus entity;
retrieving the selected authorization filter to identify the one or more database query conditions to be added to the database query; and
modifying the database query to include the one or more database query conditions; and
executing the modified database query to retrieve a set of query results, as constrained by the one or more conditions added to the database query.

8. The computer readable storage medium of claim 7, wherein applying the authorization filter comprises, invoking an executable plug-in associated with the authorization filter to identify an authorization type, wherein the identified authorization type specifies the particular one or more conditions to add to the database query.

9. The computer readable storage medium of claim 8, wherein the executable plug-in determines an authorization type based on at least one of an identity of a user submitting the database query, a group membership of the user, and a functional role of the user.

10. The computer readable storage medium of claim 7, wherein the added conditions comprise database query elements, composed according to a query language used by the database.

11. The computer readable storage medium of claim 7, wherein the database query comprises an abstract query composed according to a data abstraction model, wherein the data abstraction model defines a plurality of logical fields, and wherein each logical field specifies an access method for accessing data in the database corresponding to the logical field, and wherein the data abstraction model defines the plurality of focus entities, wherein a user specifies the focus for the abstract query by selecting the focus entity from the plurality of focus entities.

12. The computer readable storage medium of claim 11, wherein the modification to the database query includes masking data included in a set of query results, without removing instances of the selected focus entity from the set of query results.

13. A system, comprising:
a processor; and
a memory containing a program, which when executed by the processor is configured to perform an operation for managing access to data in a database organized according to a particular schema, the operation comprising:
receiving a database query that includes a reference to a focus entity specifying a user-selected focus for the database query independent from any database objects referenced in the database query, wherein the focus entity is selected from a plurality of predefined focus entities, wherein each focus entity is defined by a plurality of data relationships between data in the database and references at least one authorization filter, wherein each authorization filter directly specifies one or more database query conditions to add to the to the database query, and wherein the one or more database query conditions are composed according to a query language used by the database,
selecting to apply at least the authorization filter referenced by the focus entity included in the database query to the database query, the selected authorization filter being selected from a plurality of authorization filters each corresponding to a different focus entity,
retrieving the selected authorization filter to identify the one or more database query conditions to be added to the database query, and
modifying the database query to include the one or more database query conditions; and
executing the modified database query to retrieve a set of query results, as constrained by the one or more conditions added to the database query.

14. The system of claim 13, wherein applying the authorization filter comprises, invoking an executable plug-in associated with the authorization filter to identify an authorization type, wherein the identified authorization type specifies the particular one or more conditions to add to the database query.

15. The system of claim 14, wherein the executable plug-in determines an authorization type based on at least one of an identity of a user submitting the database query, a group membership of the user, and a functional role of the user.

16. The system of claim 13, wherein the added conditions comprise database query elements, composed according to a query language used by the database.

17. The system of claim 13, wherein the database query comprises an abstract query composed according to a data abstraction model, wherein the data abstraction model defines a plurality of logical fields, and wherein each logical field specifies an access method for accessing data in the database corresponding to the logical field, and wherein the data abstraction model defines the plurality of focus entities, wherein a user specifies the focus for the abstract query by selecting the focus entity from the plurality of focus entities.

18. The system of claim 17, wherein the modification to the database query includes masking data included in a set of query results, without removing instances of the selected focus entity from the set of query results.

* * * * *